United States Patent
Spriegel

(10) Patent No.: US 6,440,303 B2
(45) Date of Patent: Aug. 27, 2002

(54) FLUID FILTER

(75) Inventor: Clark F. Spriegel, Attica, NY (US)

(73) Assignee: Chapin Manufacturing, Inc., Batavia, NY (US)

( * ) Notice: Subject to any disclaimer, the term of this patent is extended or adjusted under 35 U.S.C. 154(b) by 0 days.

(21) Appl. No.: 09/797,921

(22) Filed: Mar. 2, 2001

Related U.S. Application Data

(60) Provisional application No. 60/186,467, filed on Mar. 2, 2000.

(51) Int. Cl.$^7$ ................................................ B01D 35/02
(52) U.S. Cl. .................. 210/232; 210/460; 210/497.01; 137/140
(58) Field of Search .......................... 137/140; 210/232, 210/459, 460, 497.01

(56) References Cited

U.S. PATENT DOCUMENTS

| | | | |
|---|---|---|---|
| 248,886 A | * | 11/1881 | Saal |
| 756,517 A | * | 4/1904 | Miller |
| 1,230,971 A | * | 6/1917 | Wilson |
| 1,644,121 A | * | 10/1927 | Greene |
| 1,788,709 A | | 1/1931 | De Spain |
| 3,616,916 A | * | 11/1971 | Greene ........................ 210/169 |
| 3,744,640 A | * | 7/1973 | Grover |
| 3,783,888 A | * | 1/1974 | Johnson |
| 3,833,124 A | | 9/1974 | Sugiyama et al. |
| RE29,405 E | | 9/1977 | Gunzel, Jr. et al. |
| 4,118,323 A | | 10/1978 | Sugiyama et al. |
| 4,220,285 A | | 9/1980 | Gualdi |
| 4,411,788 A | | 10/1983 | Kimura |
| 4,603,794 A | | 8/1986 | DeFord et al. |
| 5,252,210 A | | 10/1993 | Kessel |
| 5,269,338 A | * | 12/1993 | Figas ........................ 210/169 |
| 5,376,272 A | | 12/1994 | Spearman |
| 5,441,637 A | * | 8/1995 | Gutjahr et al. ............... 210/232 |
| 5,534,152 A | | 7/1996 | Schick |
| 5,545,318 A | * | 8/1996 | Richmond ................... 210/232 |
| 5,567,323 A | * | 10/1996 | Harrison, Jr. ................ 210/251 |
| 5,922,197 A | | 7/1999 | Sparks |
| 5,966,775 A | | 10/1999 | Berfield |

* cited by examiner

Primary Examiner—Robert J. Popovics
(74) Attorney, Agent, or Firm—Jaeckle Fleishmann & Mugel, LLP

(57) ABSTRACT

A substantially clog-resistant self-supporting fluid filter for attachment to a discharge tube or the like, comprising a cylindrically shaped grid open at both ends, having a first plurality of substantially parallel ribs crossed by and fastened to a second plurality of substantially parallel ribs at an angle to the first plurality of ribs.

Spaces or apertures formed between each adjacent pair of parallel ribs provides passage for liquids to be filtered there through. A circular shaped stop member or snap-on cap having raised radial spacers or lugs is attached to one end of the filter, and prevents the end of the discharge tube slidably inserted into the filter from hitting the top surface of the snap-on cap. Snap-on cap has clips on the outer diameter of the top surface that securely attach the cap to the filter. The fluid filter further comprises a snap-on nipple insert for sealingly engaging the discharge tube and attaching the discharge tube to the filter. The snap-on nipple insert comprises a base, a ribbed body, a tubular body member, and a substantially cylindrical longitudinal opening along the axis of the insert to permit free flow of liquids and gases through the nipple insert. When the fluid filter is attached to the opening at one end of a discharge tube and placed in a fluid filled tank, the discharge tube can extend to the bottom of the tank to be emptied in order to draw any fluid remaining in the bottom of the tank.

7 Claims, 10 Drawing Sheets

FLUID FILTER

CROSS-REFERENCE TO RELATED APPLICATIONS

This application claims the benefit of U.S. Provisional Patent Application Serial No. 60/186,467, filed Mar. 2, 2000.

FIELD OF INVENTION

This invention relates to fluid filters, and more specifically to substantially clog-resistant fluid filters for attachment to the end of a suction pipe, discharge tube and the like, located in a fluid containing tank.

DISCUSSION OF PRIOR ART

As is well known, suction pipes, discharge tubes and the like, useful for drawing fluids from tanks are typically provided at the tip thereof with a fine mesh or net used as a filter adapted to prevent impurities, contaminates or other undesirable or undissolved particulate material from being entrained by the fluid being drawn. Such filters heretofore known in the art are mostly of the type having a net or mesh-like filter stretched along an opening in such conduits. Fine meshes or nets used as filters are highly susceptible to clogging, and are even more susceptible to damage under conditions of extreme pressure combined with jagged debris caught by the filter. This renders these types of filters of little use in applications such as garden sprayers or recreational fuel tanks, where typically varied and voluminous amounts of debris get into the sprayers or tanks, thereby posing a series threat to the structural integrity of these kinds on filters.

U.S. Pat. No. 4,118,323 to Sugiyama et al., ("Sugiyama '323") disclose a plastic strainer in combination with a suction pipe. The strainer comprises a cylindrical body with a tubular top frame and an non-perforated bottom board that are connected by a plurality of circumferentially spaced support elements. A circular cover that fits the top frame has a center through hole provided with a tubular connector that facilitates insertion of a vacuum pipe into the strainer body. The cover is removably attached to the strainer body by a plurality of nail catches on the top frame that snap into a corresponding plurality of holes in a flange extension of the cover. A fine mesh net is partially embedded in and integrally connected to the top frame, bottom board, and support elements of the strainer body. The maximum depth of penetration of the discharge tube into the strainer frame is determined by an annular bulge on the tube and an annular groove in the top of filter.

U.S. Pat. No. 3,833,124, also to Sugiyama et al. ("Sugiyama '124"), disclose an immersion type strainer comprising a filter housing having a top plate with an opening therein, a pipe having a bulge portion, and a hollow cylindrical female piece having a recess portion on its inner surface that is complementary to the bulge portion of the pipe. The cylindrical female piece includes a raised portion at one end and an annular collar that cooperate to clamp the female piece to the top plate of the filter housing when the female piece is fitted in the opening of the top plate.

U.S. Pat. No. 4,411,788 to Kimura ("Kimura") discloses a filter for a gasoline tank that comprises a cylindrical filter body having a base and sidewalls, with a net stretched along the periphery thereof, and a lid to cover the open end of the filter body and provided with an insertion hole for a suction pipe. Located on the base of the filter body are a receiving portion and support pieces that engage the tip of the suction pipe. The ribs have support pieces with a surface that establish the maximum depth of the tube's penetration into the filter.

The filters disclosed in the above references are not self-supporting structures and rely upon a mesh and a separate mesh support structure in order to form the filtering element. Such separation of components necessitates undesirable assembly, and presents the possibility of disassembly or disconnection problems under physical stress to the filter.

FIGS. 1a and 1b depict typical conventional prior art net or mesh filters 45, such as those used in sprayers and the like, and their relative orientations with respect to the end of a discharge tube 25 in tank 55 containing fluid 65. Either discharge tube (depicted in FIG. 1a) or filter 45 (depicted in FIG. 1b) has a cylindrical stop member (35a,35b respectively) located thereon for preventing discharge tube 25 from extending to the end or bottom 47 of filter 45. Cylindrical stop member 35a,35b functions primarily to space the opening of discharge tube 25 from the bottom 57 of tank 55 so that the opening does not become clogged or blocked with debris, undissolved particulate matter or the like.

However, in an attempt to prevent the end of the discharge tube from clogging with debris, neither of the conventional prior art solutions depicted in FIGS. 1a and 1b locates the end of the discharge tube at or very near the bottom of the tank. By not locating the discharge tube at or very near the bottom of the tank the user is unable to draw any fluid remaining in the bottom of the tank, thereby wastefully and inefficiently leaving fluid behind. Therefore, what is needed is a self-supporting, substantially clog-resistant filter for attachment to the end of a discharge tube located on or very near the bottom of a fluid filled tank, in order to draw fluid remaining in the bottom of the tank.

SUMMARY

The present invention comprises a self-supporting, substantially clog-resistant, fluid filter located over an opening at the end of a liquid discharge tube, thereby permitting the opening of the liquid discharge tube to extend substantially to the bottom of the fluid filled tank to be emptied. The filter comprises a cylindrically shaped grid, open at both ends, having a first plurality of substantially parallel ribs crossed by and fastened to a second plurality of substantially parallel ribs at an angle to the first plurality of ribs. Spaces or apertures formed between each adjacent pair of parallel ribs provides passage for liquids to be filtered there through, while each of the ribs provide an obstacle for preventing passage of substantially solid matter that may be intermixed or contaminate the liquid. The filter is considered self-supporting because the ribs that from the filter provide all of the necessary structural strength needed for its support. Additionally, at the end of the filter located nearest the bottom of a fluid filled tank, the invention further provides a circular stop member, referred to herein as a snap-on cap cover element or snap-on cap, having raised radial spacers or lugs that stop or prevent the end of the discharge tube from hitting the bottom circular wall of the cover element. The snap-on cap has clips on its outer diameter that securely attach the cover element to the filter.

It is a further object of this invention to provide improved elements and arrangements thereof for the purposes described which are inexpensive, dependable and fully effective in accomplishing its intended purposes. These and other objects of the present invention will become readily apparent upon further review of the following specification and drawings.

DESCRIPTION OF DRAWINGS

FIG. 8a depicts operation of the invention when fully immersed in a tank containing fluid and debris, FIG. 8b depicts operation of the invention when partially immersed in a tank containing fluid and debris.

Corresponding reference characters indicate corresponding parts throughout the several views. The exemplifications set out herein illustrates preferred embodiments of the invention, in one form, and such exemplifications are not to be construed as limiting the scope of the invention in any manner.

DETAILED DESCRIPTION OF INVENTION

Figure 1A:
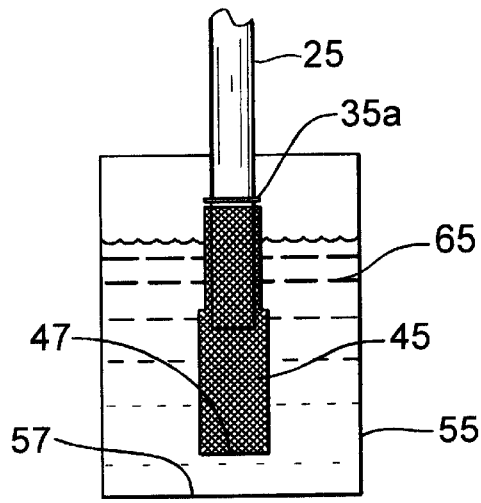
FIGS. 1a and 1b depict examples of conventional prior art filters and their relative orientation with respect to the end of a discharge tube used in drawing fluids from fluid filled tanks.
Figure 1B:
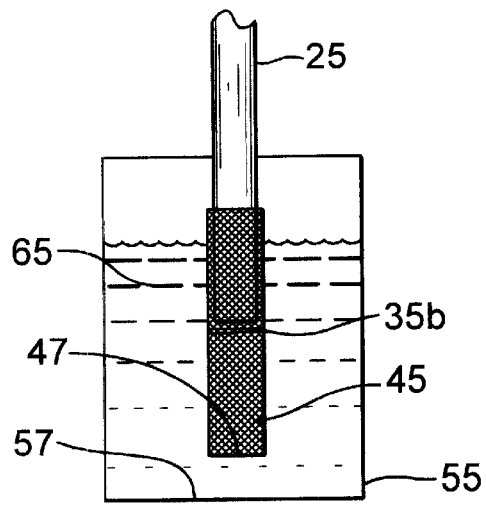

The present invention will be described below with reference to the illustrated embodiments referred to in FIGS. 2a, 2b, 2c, 2d, 2e, 3a, 3b, 3c, 4a, 4b, 5a, 5b, 6a, 6b, 7, 8a and 8b. The invention, as depicted in FIGS. 2a, 2b, 2c, 2d, and 2e combines two separate elements of the prior art, a filter and a filter supporting structure, into a single cylindrical fluid filter 100 that is a self-supporting structure, and substantially clog-resistant. The cylindrical filter 100 is preferably constructed with a first plurality of substantially parallel inner longitudinal undulating ribs 110 encircled by second plurality of substantially parallel outer circular ribs 120 thereby forming a grid-like pattern or filtering surface to establish filter openings or apertures 130. The crossed inner and outer ribs provide the structural support for the filter openings 130 and the filter itself. In a preferred embodiment, the first and second substantially parallel ribs comprise, respectively, plastic rods and plastic rings.

Figure 3A:
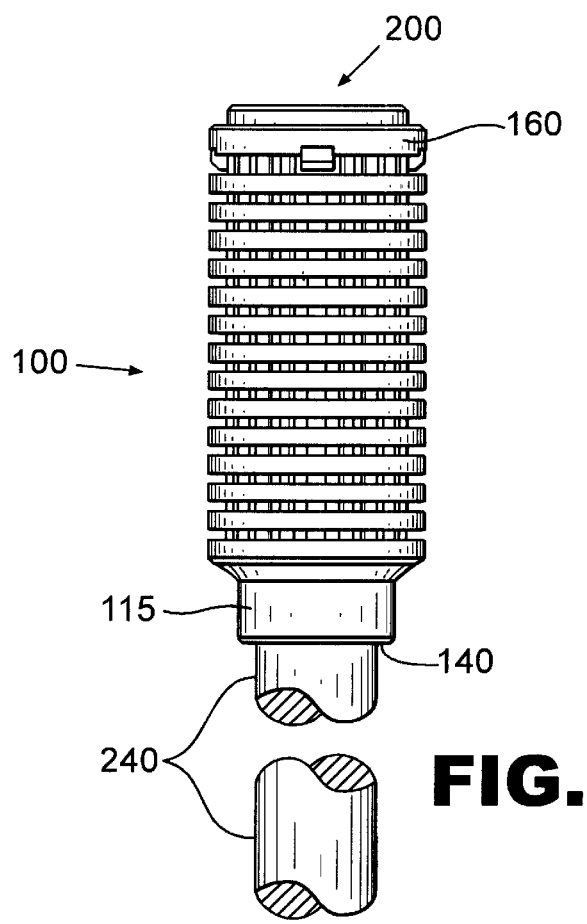
FIGS. 3a and 3b depict a side view and an exploded perspective view respectively, of the filter and a snap-on cap cover element attached to a discharge tube according to one embodiment of the present invention.
Figure 3B:
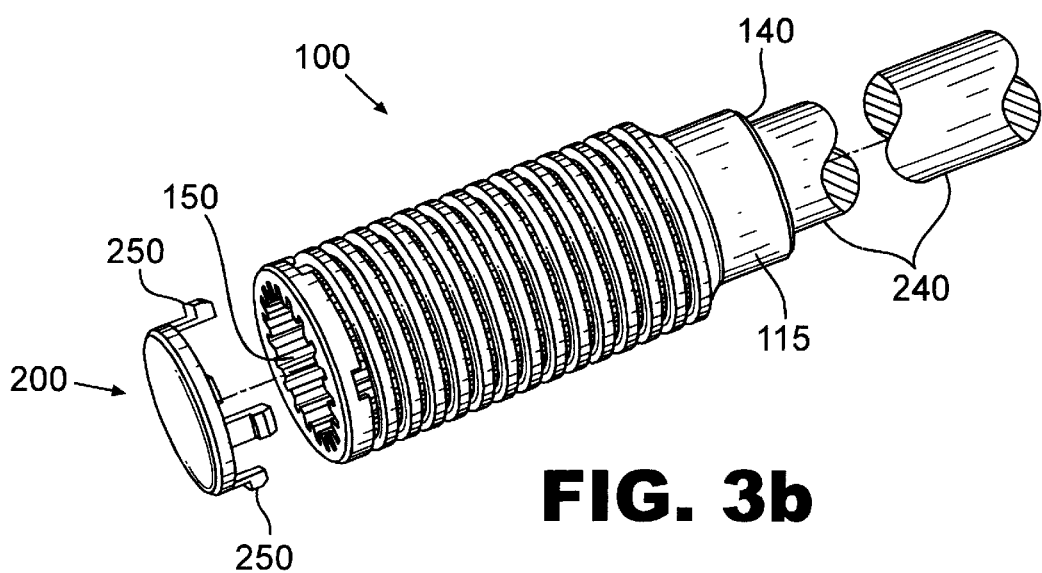
Figure 3C:
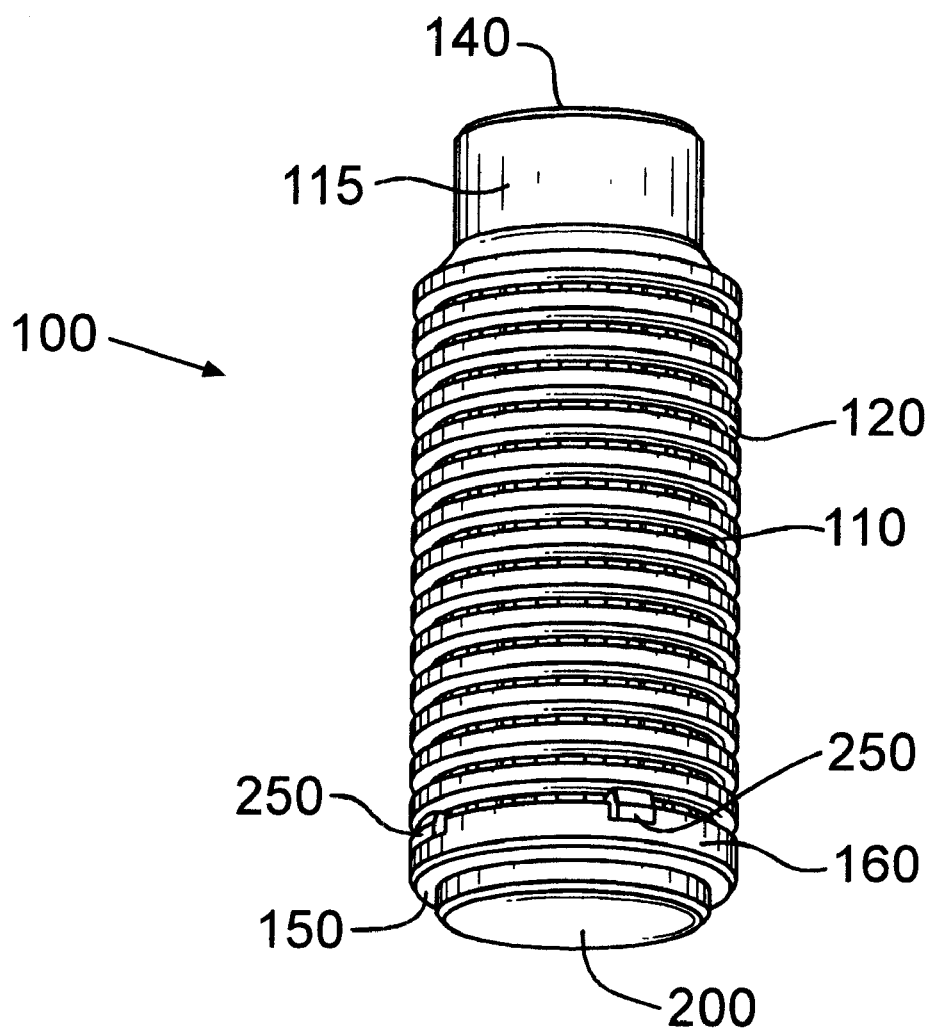
FIG. 3c depicts a side perspective view of an assembled filter and a snap-on cap cover element according to one embodiment of the present invention.

A discharge tube 240 (FIGS. 3a and 3b) fits securely and slidably into a tube receiving portion 115 attached to one end of filter 100 and having opening 140. Opening 150, at one end of filter 100 opposite opening 140, receives a snap-on cap cover element 200 (FIGS. 3a and 3b) that snaps onto last rung 160 of filter 100. FIG. 3c depicts an assembled view of cylindrical filter 100 with snap-on cap 200 snapped into holes 125 on last rung 160 of filter 100, thereby substantially closing opening 150.

As depicted in FIGS. 3a, 3b, 3c, 4a and 4b, snap-on cap 200 has a substantially circular-shaped base 230 having a substantially flat bottom surface 220 and a substantially flat top surface 225. Raised radial spacers or lugs 210 are located on top surface 225 for engaging the end of discharge tube 240 prior to bottoming out on top surface 225, thereby spacing the end of discharge tube 240 from top surface 225 and preventing the end of tube 240 from becoming blocked and unable allow for the passage of liquids there through. Snap-on cap 200 snaps onto last filter rung 160 of filter 100 by means of flanges 250, attached to the outer diameter of top surface 225. Each flange 250 has a pawl for engaging openings 125 in filter 100 below last rung 160 (see FIGS. 2a, 2b, 3a, 3b and 3c), or for engaging openings 125a in filter 100 below last rung 160a as depicted FIGS. 2c and 2d.

Snap-on cap 200 closes off opening 150 located on one end of filter 100, thereby protecting the filter structure from damage, penetration and the like. The prior art does not teach a filter element that performs these functions in combination with a structurally self-supporting filter structure.

Figure 4A:
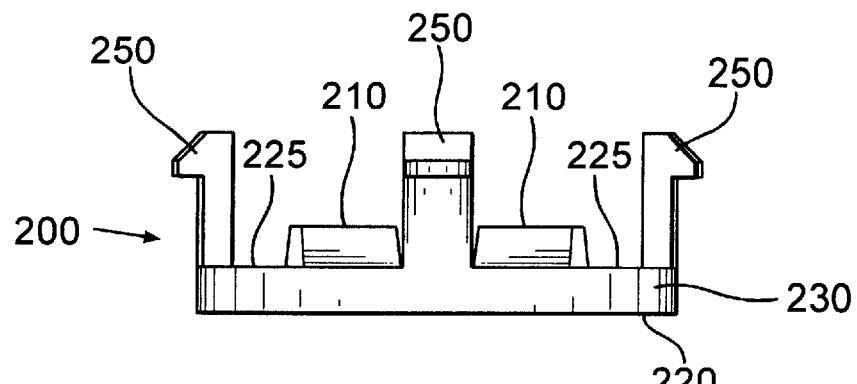
FIGS. 4a and 4b depict a side view and a top view respectively of the snap-on cap according to one embodiment of the present invention.
Figure 4B:
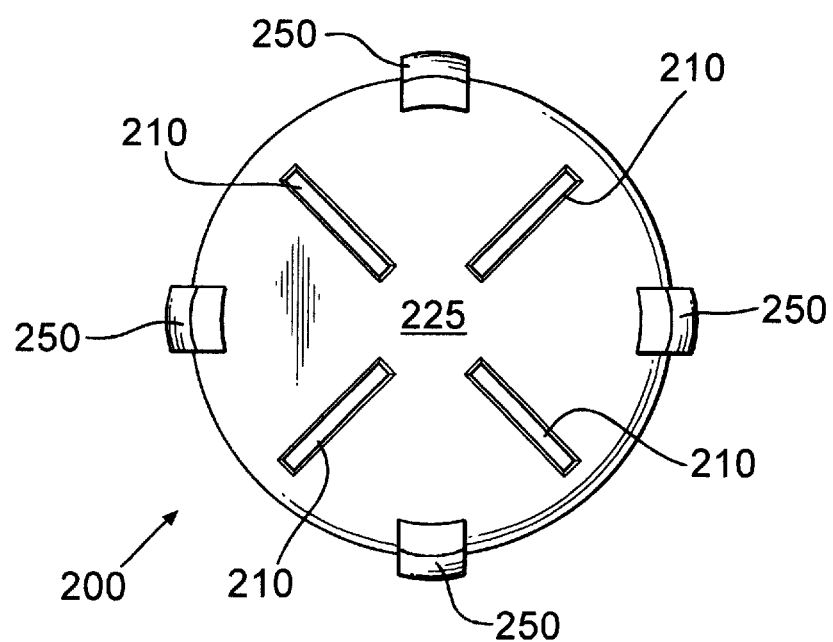

The basic shape of snap-on cap 200 and the relative height of raised radial spacers 210 from the bottom surface 220 of snap-on cap 200 are depicted in FIGS. 4a and 4b. For certain applications, the clearance between the height of radial spacers 210 and bottom surface 220 of snap-on cap 200 may leave more liquid inaccessible in the bottom of a fluid filled tank than is desired for a particular application. Alternative embodiments of snap-on cap 200 are depicted in FIGS. 5a, 5b, 6a, and 6b, and provide for more complete drainage of any fluid remaining in the bottom of a 20 fluid filled tank.

Figure 5A:
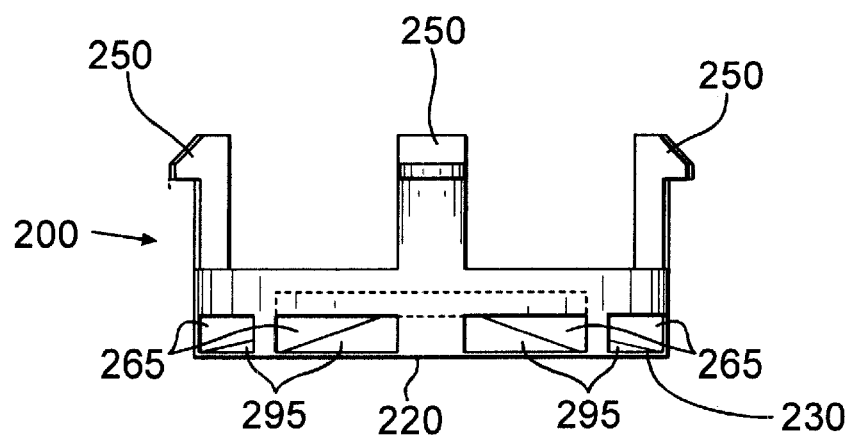
FIGS. 5a and 5b depict a side view and a top view respectively, of a second embodiment of the snap-on cap according to the present invention.
Figure 5B:
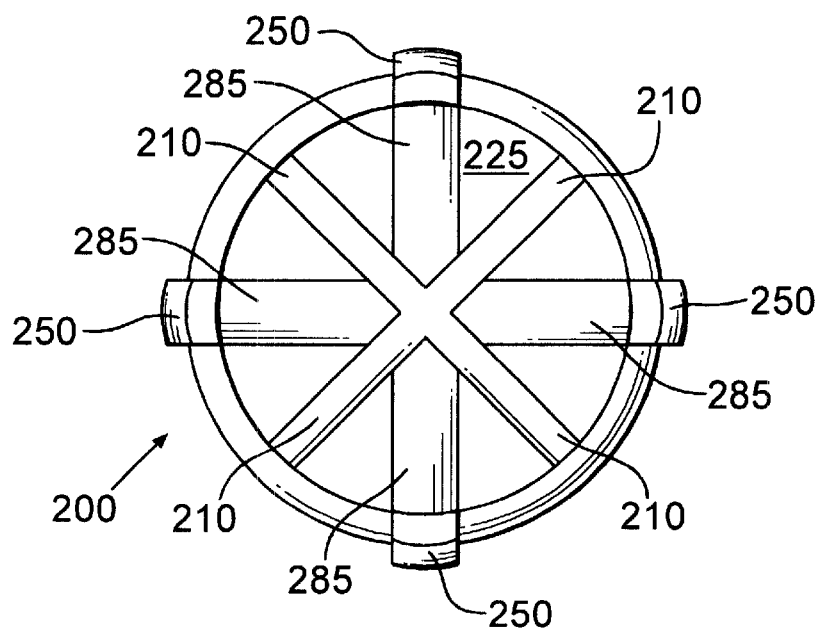

FIGS. 5a and 5b depict an alternative snap-on cap 200 embodiment having the same basic shape profile as snap-on cap 200 depicted in FIGS. 4a and 4b. However, in snap-on cap 200 depicted here, substantially flat inner bottom surface 225 has been modified with reinforced radiating ribs 285 that extend to each flange 250 (FIG. 5b), and graded conical surfaces 295 (FIG. 5a) between each two ribs, reinforcing side openings 265 in base 230 and forming a graded inner cap surface. As depicted in FIGS. 5a and 5b radial spacers 210 extend radially from the center of snap-on cap 200 to its outer diameter in order to strengthen snap-on cap's bottom edge along base 230 that is thinner when compared to the thickness of base 230 depicted in FIGS. 4a and 4b.

In FIGS. 5a and 5b, the height of radial spacers 210 have been reduced to maintain the same clearance between the graded inner cap surface and the bottom of discharge tube 240 as exists between the flat top surface 225 and the bottom of discharge tube 240 shown in FIGS. 4a and 4b. The effect of this is that when discharge tube 245 is perpendicular to the bottom of a fluid filled tank, side openings 265 in base 230 reach closer to the bottom of a fluid filled tank than is possible with snap-on cap 200 depicted in FIGS. 4a and 4b.

As depicted in FIG. 5a, graded surface 295 opens out to all side openings 265 of snap-on cap 200 and diminishes the overall vertical barrier to fluid outside snap-on cap 200. Along with the accompanying reduction in height of radial spacers 210, substantially more fluid can be removed from the bottom of a fluid filled tank when filter 100, attached to a discharge tube or the like, incorporates a snap-on cap having this configuration.

Figure 6A:
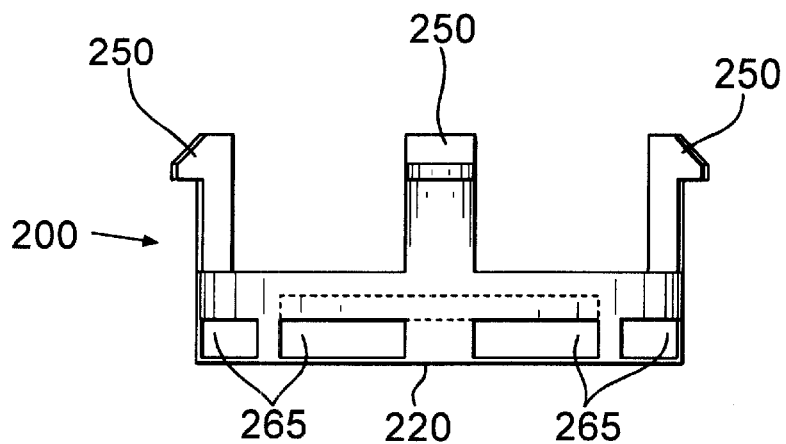
FIGS. 6a and 6b depict a side view and a top view respectively, of a third embodiment of the snap-on cap according to one embodiment of the present invention.
Figure 6B:
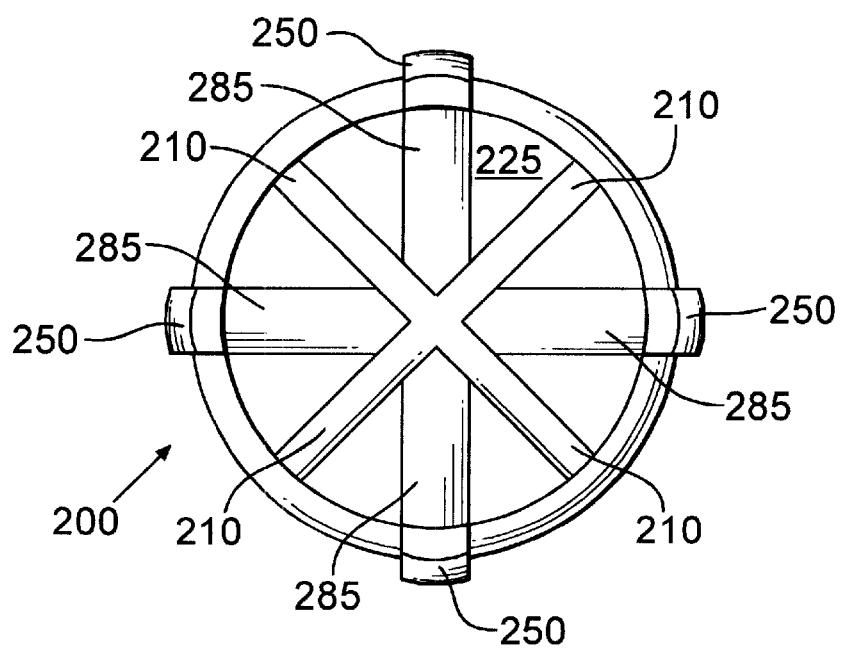

FIGS. 6a and 6b depict another alternative snap-on cap 200 embodiment that is variation of snap-on cap 200 depicted in FIGS. 5a and 5b. Here, side openings 265 remain open except for the supports for raised radial spacers 210 and flanges 245 that function to reinforce the side openings 265.

Each of the snap-on cap 200 embodiments depicted in FIGS. 5a, 5b, 6a, and 6b promote more complete drainage of fluid remaining in the bottom of the fluid filled tank. Other embodiments for snap-on cap 200 are contemplated that may vary the topology of the inner surface of the snap-on cap to offer additional structural strength, while narrowing still further the gap between the bottom of the discharge tube and the bottom of a fluid filled tank. All embodiment may have dimensions and openings organized on snap-on cap 200 so as to replicate the function of the filter itself. The reinforced side openings 265 in snap-on cap 200 depicted herein are merely illustrative. The shapes of side openings 265 should not be limited to the shapes depicted herein, but may have a variety of sizes, shapes and designs, so long as the reinforced side openings 265 are consistent with the filtering requirements for each particular application.

Figure 7:
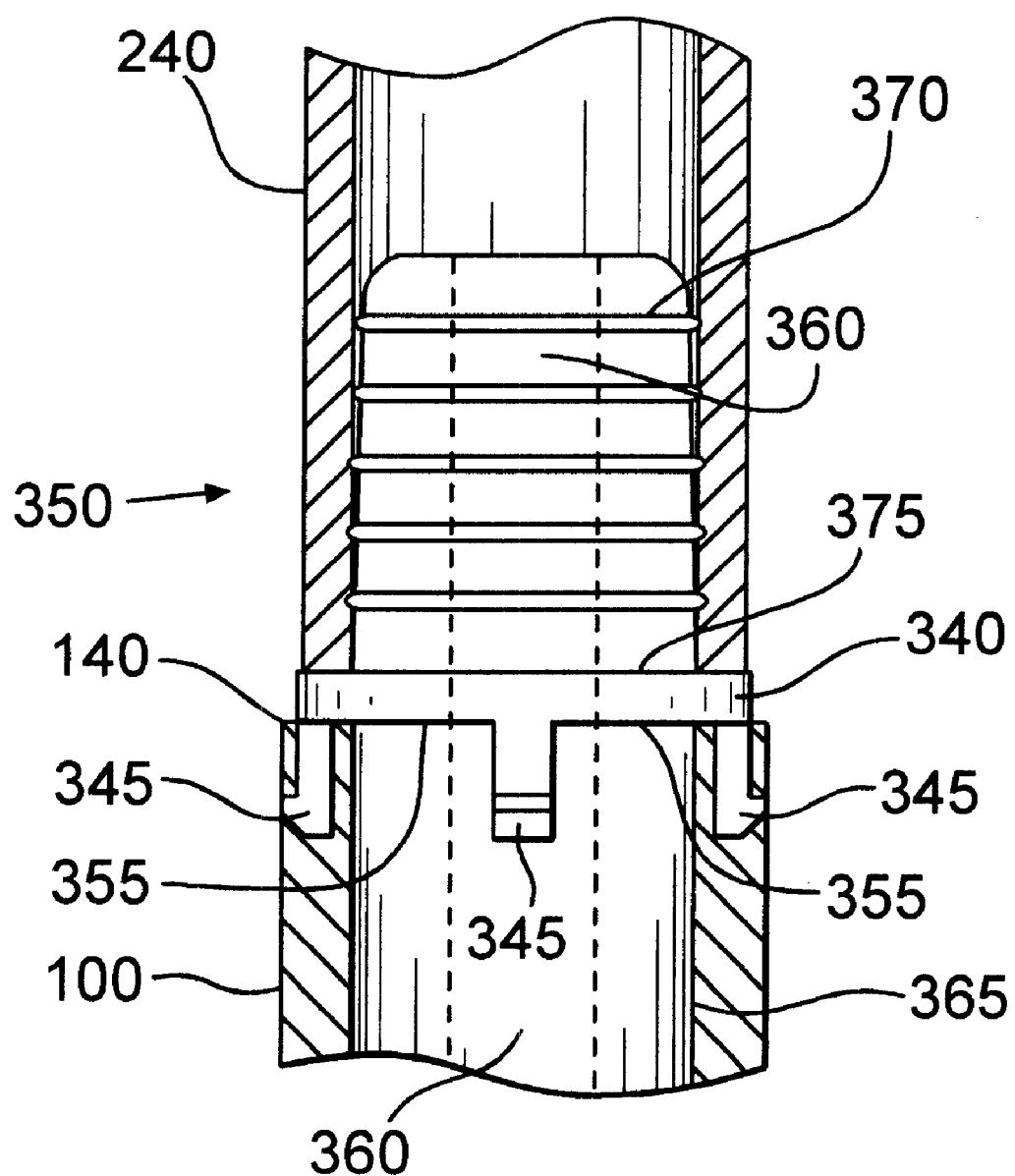
FIG. 7 depicts a side view of a nipple insert in profile securely joining the filter and discharge tube (each shown in phantom) according to one embodiment of the present invention.

An other embodiment of the invention depicted in FIG. 7 features a snap-on nipple insert 350 connecting discharge tube 240 to filter 100. Nipple insert 350 comprises a base 340 with a top surface 375 and a bottom surface 355, a substantially cylindrical tubular member 365 attached to bottom surface 355 of base 340, a ribbed body 370 having a plurality of ribs located on top surface 375 of base 340, an inner substantially cylindrical tube or conduit 360 running longitudinally along the entire inner axis of insert 350 to permit free flow of fluids and gases through insert 350, and flanges 345 attached to bottom surface 355 of base 340.

Each flange 345 has a pawl for engaging an opening 125b (FIGS. 2c, 2d and 2e) at open end 140 of filter 100 located below rung 160b, thereby securely attaching insert 350 to filter 100. Ribbed body 370 of nipple insert 350 sealingly engages the inner wall of discharge tube 240, thereby securely connecting to filter 100 to discharge tube 240.

Since discharge tube 240 does not penetrate the body of filter 100 in this embodiment, substantially the entire range of filter apertures or openings 130 (not shown in FIG. 7) will have substantially uniform access to the open end of discharge tube 240. Although tubular member 365 penetrates the body of filter 100, uniform access to substantially the entire range of filter apertures 130 (see FIGS. 8a and 8b) remains because tubular member 365 has a substantially smaller diameter than the inner diameter of filter 100, resulting considerable clearance between tubular member 365 and the inner walls of filter 100.

Figure 2A:
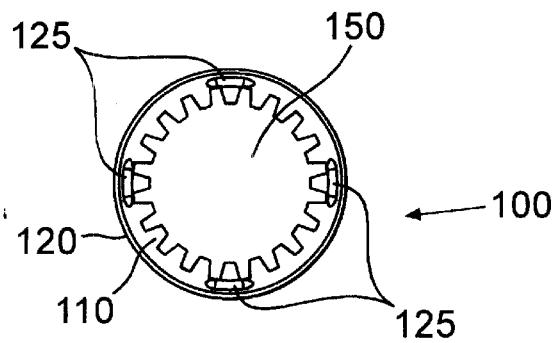
FIGS. 2a and 2b depict a top view and a side view respectively, of a filter according to one embodiment of the present invention.
Figure 2B:
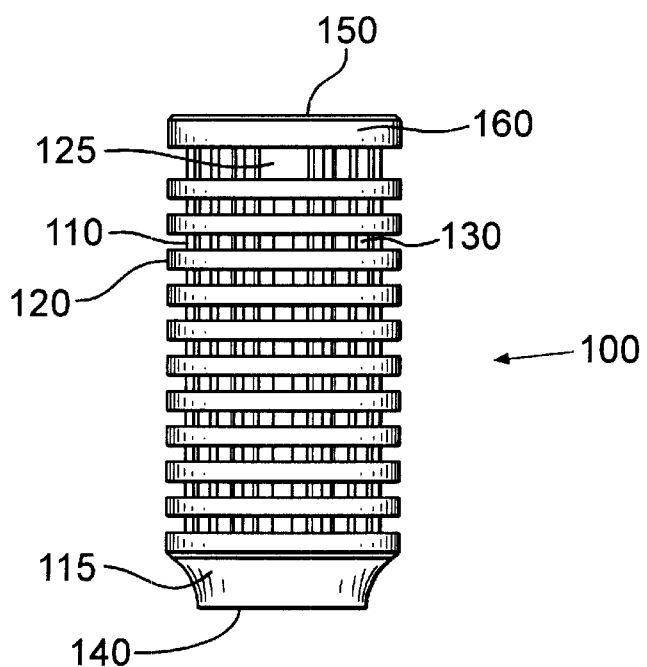
Figure 2C:
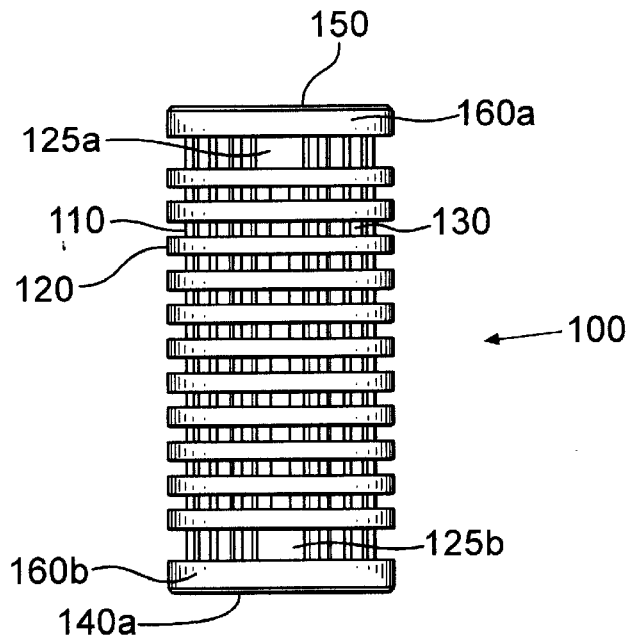
FIGS. 2c, 2d, and 2e depict a side view, a top view and a bottom view respectively, of the filter according to one embodiment of the present invention.
Figure 2D:
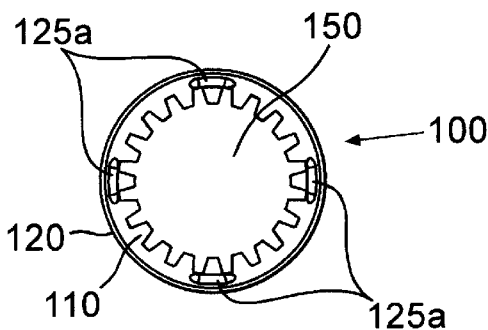
Figure 2E:
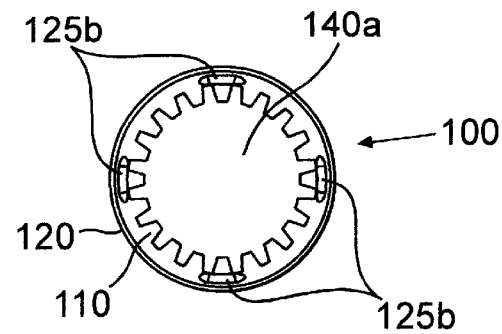

FIGS. 2c, 2e and 2d depict alternative embodiment to the invention, wherein filter 100 is adapted for receiving both snap-on cap 200 and nipple insert 350, in the manner as previously disclosed. In FIGS. 2c and 2e nipple insert 350 attaches to filter 100 at opening 140a.

Figure 8A:
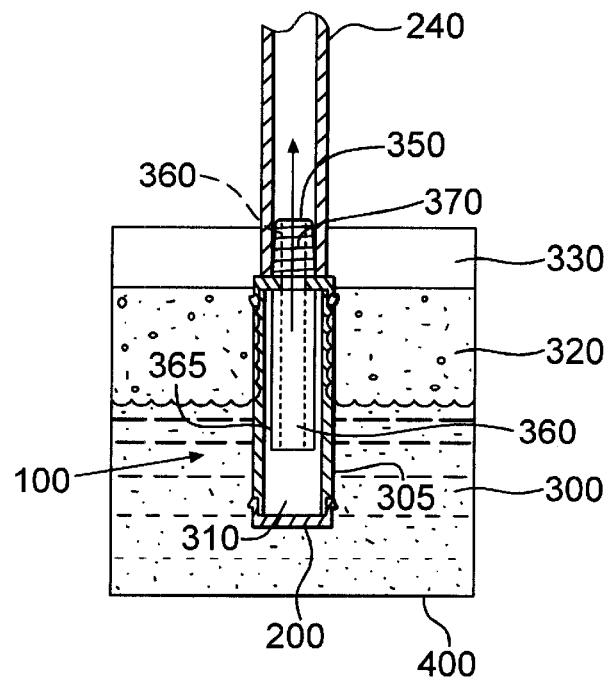
FIGS. 8a and 8b depict the filter, discharge tube and nipple insert in operation according to alternative embodiments of the present invention.

FIG. 8a depicts the operation of the invention when immersed in debris contaminated fluid 300 in a tank 400, wherein debris 320 blocks a portion of filter surface 305 as shown, thereby preventing the filtering of fluid 300 through filter 100 at these clogged or block filter surface regions. However, due to the extensive filter surface area presented at a wide range of depths, filter 100 continues to draw filtered liquid 310 into discharge tube 240 at a substantial rate through the unblocked filter surface 305 regions. In this embodiment, filtering surface 305 is not exposed to air and/or gas 330 located at the top of tank 400, because surface 305 is located below air and/or gas 330 region—unlike filtering surface 305 depicted in FIG. 8b and discussed below.

Figure 8B:
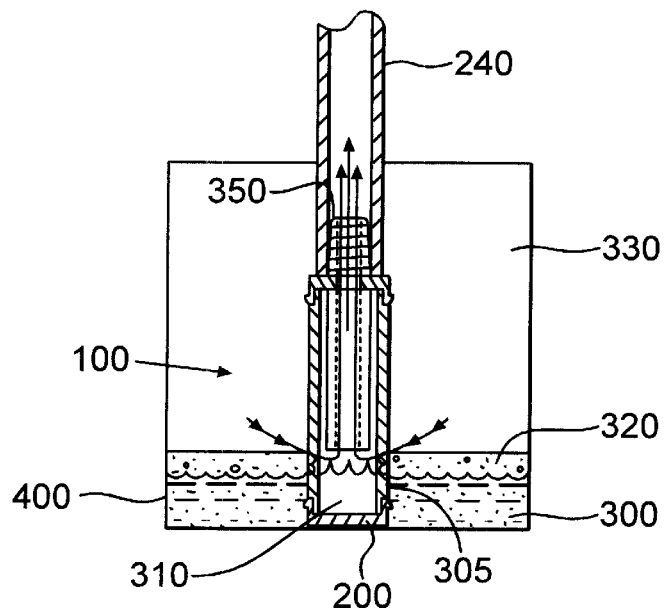

FIG. 8b depicts the operation of the invention wherein an amount of fluid 300 in tank 400 depicted in FIG. 8a has been removed, and filter 100 is now immersed in debris contaminated fluid 300 to the maximum depth—that is, filter 100 is located at the bottom of tank 400. Additionally, the uppermost region of filter surface 305 is now exposed to air and/or other gases 330 present above the surface of debris contaminated fluid 300; the middle segment of filter surface 305 is now blocked by debris 320, and the bottom segment of filter surface 305 remains open to freely filter fluid 300. Although discharge tube 240 may draw some air and/or gases 330 out with filtered liquid 310 because of the portion of the filter surface 305 exposed to air or other gases, the resulting rapid passage of air or gases 330 lowers the pressure within filter 100 (the Bernoulli Principle). As depicted in FIG. 8b, the lower pressure within filter 100 causes the level of filtered liquid 310 to rise inside the filter, wherein some or all of the filtered fluid 310 is entrained to be discharged with the exiting gases. This same principles and effects apply whether the debris floats on the surface of the fluid as shown, and/or floats suspended at all or various levels in the fluid, and/or settles to the bottom of the tank.

The invention's potential applications include, but are not limited to, paint and varnish sprayers, garden sprayers, liquid fuel tank feed systems, sumps and the like. One example of the advantages associated with the invention is evident when the filter is used in a garden hand sprayer. Grass and dirt are common filtered elements in a garden hand sprayer. Grass and dirt quickly clog fine mesh filters typically used in conventionally known sprayers. Because the invention does not use a fine mesh, and offers a filter surface area over a wide range depths, as depicted in FIGS. 8a and 8b, it is substantially less susceptible to clogging. This same advantage for the invention exists when used with other types of filtering applications.

The invention was tested to determine its efficacy, wherein filter 100, comprising the elements depicted in FIGS. 2a, 2b, 3a, 3b, 4a and 4b, was attached to the end of an outlet tube and placed into a compressed air sprayer. The tank was then filled to its capacity level of I gallon with water. To test the effectiveness of filter 100 against a heavily-contaminated load, contaminants comprising about ½ cup dirt and gravel, about ½ cup of grass, about ½ cup of plastic shavings, and about ½ cup of sawdust were introduced into the water in the tank. In order to demonstrate the capabilities of the invention, this mixture was made atypically diverse and overloaded with contaminants, however, it should be noted that in the normal course of operation, expected contaminants would typically contain fewer ingredients and at a much lower concentration than used in these tests. A pump was affixed to the tank and the tank was pressurized to 40 psi. The shut-off valve was opened, allowing the unit to deliver a spray pattern until the tank was emptied. No pluggage or distortion of the spray pattern occurred. This was repeated 10 times exhibiting approximately the same results.

A second series of tests were performed for comparing the present invention to an unfiltered spraying operations. Here, filter 100 was removed from the outlet tube, and the same tests were conducted again. However, without filter 100, each time the valve was opened, it plugged within 4 to 15 seconds, rendering the sprayer useless. Each time the unit plugged, the valve and nozzle had to be dismantled and cleaned.

A third series of tests were performed for comparing the present invention to a spraying operation using a conventional filter under the same conditions as above. The conventional filter was located inside the shut-off valve while the tests were conducted. In less than 1 minute, the filter inside the shut-off valve also plugged, rendering the unit useless. Each time the unit plugged, and had to be dismantled and cleaned.

When directly immersed in the solution being sprayed the invention was able to draw liquid through the sediment, straining the liquid and allowing it to flow through the shut-off valve and nozzle orifices without plugging. These tests demonstrate the invention's effectiveness.

By appropriately scaling the desired dimensions of the invention for use in different embodiments, the present invention may be used for larger or smaller filtering applications, from draining large storage tanks to straining fuel for very small engines. The invention itself requires no specific size of filter apertures, filters, discharge tubes, or tanks, except as required for each specific application. Furthermore, the invention requires no specific materials in its construction except as required for each specific application.

While the invention has been described with reference to preferred embodiments, it will be understood by those skilled in the art that various changes may be made and equivalents may be substituted for elements thereof without departing from the scope of the invention. For example, the two sets of ribs comprising the filter and its supporting structure need not be rectilinearly parallel or perpendicular to the filter's cylindrical axis. In alternative embodiments, both inner and outer sets of ribs may be helically parallel, but at a substantial angle to each other so as to form useful filter apertures. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

What is claimed:

1. A substantially clog-resistant self-supporting fluid filter, for attachment to one end of a tube having an inner diameter and open at both ends, said filter comprising:

a substantially cylindrical-shaped grid open at both ends comprising a first plurality of substantially parallel ribs crossed by and fastened to a second plurality of substantially parallel ribs at an angle to said first plurality of ribs forming a plurality of apertures between each adjacent pair of parallel ribs;

wherein said apertures provide passage for liquids through said filter and said ribs provide obstacles for preventing passage of substantially solid matter and debris intermixed with said liquid further comprising a snap-on cap cover element for closing one end of said filter, said cover element having a substantially circular-shaped base having a side opening, a top surface and a bottom surface; a flange attached to the top surface of said base having a pawl for engaging an opening in said filter thereby attaching said cover element to said filter; and a raised radial spacer located on the top surface of said base for engaging an open end of a tube slidably inserted into a remaining open end in said filter, thereby preventing the open end of the tube from bottoming out and engaging the top surface of said base that would prevent the flow of liquid into said tube.

2. The filter according to claim 1, further comprising a snap-on nipple insert for attaching said filter to the tube, said nipple insert comprising:

a base having a top surface and bottom surface, a flange attached to the bottom surface of said base, said flange having a pawl for engaging an opening said filter thereby attaching said nipple insert to said filter;

a substantially cylindrical tubular member open at both ends and attached to the bottom surface of said base for insertion into said filter;

a ribbed body open at both ends and attached to the top surface of said base for sealingly engaging the inner diameter of the tube in order to attach the tube to said filter; and a substantially cylindrical longitudinal opening along the axis of said nipple insert to permit free flow of liquids and gases through said nipple insert.

3. The filter according to claim 2, further comprising a tube receiving portion attached to one end of said filter.

4. A substantially clog-resistant self-supporting fluid filter, for attachment to one end of a tube having an inner diameter and open at both ends, said filter comprising:

a substantially cylindrical-shaped grid open at both ends comprising a first plurality of substantially parallel ribs crossed by and fastened to a second plurality of substantially parallel ribs at an angle to said first plurality of ribs forming a plurality of apertures between each adjacent pair of parallel ribs;

wherein said apertures provide passage for liquids through said filter and said ribs provide obstacles for preventing passage of substantially solid matter and debris intermixed with said liquid; and a snap-on cap cover element for closing one end of said filter, said cover element comprising:

- a substantially circular-shaped base having a side opening, a top surface and a bottom surface;
- a flange attached to the top surface of said base having a pawl for engaging an opening in said filter thereby attaching said cover element to said filter; and
- a raised radial spacer located on the top surface of said base for engaging an open end of a tube slidably inserted into a remaining open end in said filter, thereby preventing the open end of the tube from bottoming out and engaging the top surface of said base that would prevent the flow of liquid into said tube.

5. The filter according to claim 4, further comprising a snap-on nipple insert for attaching said filter to the tube, said nipple insert comprising:

a base having a top surface and bottom surface;

a flange attached to the bottom surface of said base, said flange having a pawl for engaging an opening in said filter thereby attaching said nipple insert to said filter;

a substantially cylindrical tubular member open at both ends and attached to the bottom surface of said base for insertion into said filter;

a ribbed body open at both ends and attached to the top surface of said base for sealingly engaging the inner diameter of the tube in order to attach the tube to said filter; and a substantially cylindrical longitudinal opening along the axis of said nipple insert to permit free flow of liquids and gases through said nipple insert.

6. The filter according to claim 4, further comprising a tube receiving portion attached to one end of said filter.

7. A substantially clog-resistant self-supporting fluid filter, for attachment to one end of a tube having an inner diameter and open at both ends, said filter comprising:
- a substantially cylindrical-shaped grid open at both ends comprising a first plurality of substantially parallel ribs crossed by and fastened to a second plurality of substantially parallel ribs at an angle-to said first plurality of ribs forming a plurality of apertures between each adjacent pair of parallel ribs;
- wherein said apertures provide passage for liquids through said filter and said ribs provide obstacles for preventing passage of substantially solid matter and debris intermixed with said liquid;
- a snap-on cap cover element for closing one end of said filter, said cover element comprising:
  - a substantially circular-shaped base having a side opening, a top surface and a bottom surface;
  - a flange attached to the top surface of said base having a pawl for engaging an opening in said filter thereby attaching said cover element to said filter; and
  - a raised radial spacer located on the top surface of said base for engaging an open end of a tube slidably inserted into a remaining open end in said filter, thereby preventing the open end of the tube from bottoming out and engaging the top surface of said base that would prevent the flow of liquid into said tube; and
- a snap-on nipple insert for attaching said filter to the tube, said nipple insert comprising:
  - a base having a top surface and bottom surface;
  - a flange attached to the bottom surface of said base, said flange having a pawl for engaging an opening in said filter thereby attaching said nipple insert to said filter;
  - a substantially cylindrical tubular member open at both ends and attached to the bottom surface of said base for insertion into said filter;
  - a ribbed body open at both ends and attached to the top surface of said base for sealingly engaging the inner diameter of the tube in order to attach the tube to said filter; and
  - a substantially-cylindrical longitudinal opening along the axis of said nipple insert to permit free flow of liquids and gases through said nipple insert.

* * * * *